United States Patent
Linzie et al.

(10) Patent No.: US 11,062,328 B2
(45) Date of Patent: Jul. 13, 2021

(54) SYSTEMS AND METHODS FOR TRANSACTIONS-BASED CONTENT MANAGEMENT ON A DIGITAL SIGNAGE NETWORK

(75) Inventors: Brian L. Linzie, Stillwater, MN (US); Brian E. Brooks, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 814 days.

(21) Appl. No.: 13/188,070

(22) Filed: Jul. 21, 2011

(65) Prior Publication Data

US 2013/0024270 A1    Jan. 24, 2013

(51) Int. Cl.
*G06Q 30/02*    (2012.01)

(52) U.S. Cl.
CPC ..... *G06Q 30/0201* (2013.01); *G06Q 30/0241* (2013.01)

(58) Field of Classification Search
CPC ........................ G06Q 30/0201; G06Q 30/0241
USPC ............................................ 705/14.41, 14.53
See application file for complete search history.

(56) References Cited

U.S. PATENT DOCUMENTS

| | | | |
|---|---|---|---|
| 5,287,266 A | 2/1994 | Malec | |
| 5,923,525 A | 7/1999 | Sizer | |
| 7,356,477 B1* | 4/2008 | Allan et al. | 705/14.4 |
| 8,717,917 B1* | 5/2014 | Balakrishnan | H04L 43/022 370/252 |
| 2003/0220830 A1 | 11/2003 | Myr | |
| 2007/0136133 A1 | 6/2007 | Li | |
| 2007/0252891 A1 | 11/2007 | Gurley | |
| 2008/0040211 A1* | 2/2008 | Walker et al. | 705/14 |
| 2008/0097813 A1 | 4/2008 | Collins | |
| 2008/0228695 A1 | 9/2008 | Sifry | |
| 2009/0012847 A1* | 1/2009 | Brooks et al. | 705/10 |
| 2009/0012848 A1 | 1/2009 | Brooks | |
| 2009/0012927 A1 | 1/2009 | Brooks | |
| 2009/0030780 A1 | 1/2009 | York | |
| 2010/0017288 A1 | 1/2010 | Graham, II | |
| 2010/0174671 A1 | 7/2010 | Brooks | |
| 2011/0016006 A1* | 1/2011 | Opdycke | G06Q 30/02 705/14.73 |
| 2011/0016011 A1 | 1/2011 | Opdycke | |
| 2011/0066480 A1* | 3/2011 | Herlein et al. | 705/14.5 |
| 2013/0024270 A1 | 1/2013 | Linzie | |

FOREIGN PATENT DOCUMENTS

WO    WO 2011-014881    2/2011

* cited by examiner

*Primary Examiner* — Azam A Ansari
(74) *Attorney, Agent, or Firm* — Eric E. Silverman

(57) ABSTRACT

A transaction-based content management system for a digital signage network displays a piece of content until a predetermined level of transactions occurs.

9 Claims, 8 Drawing Sheets

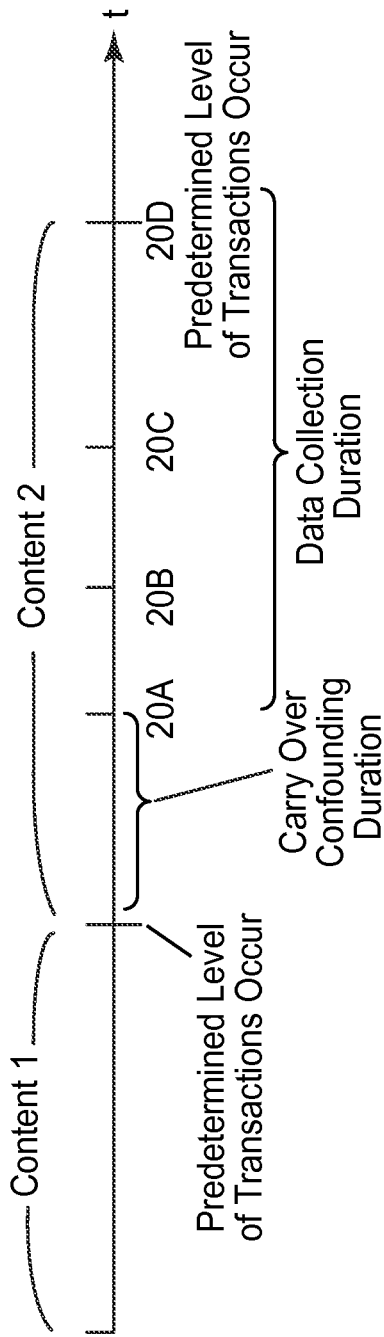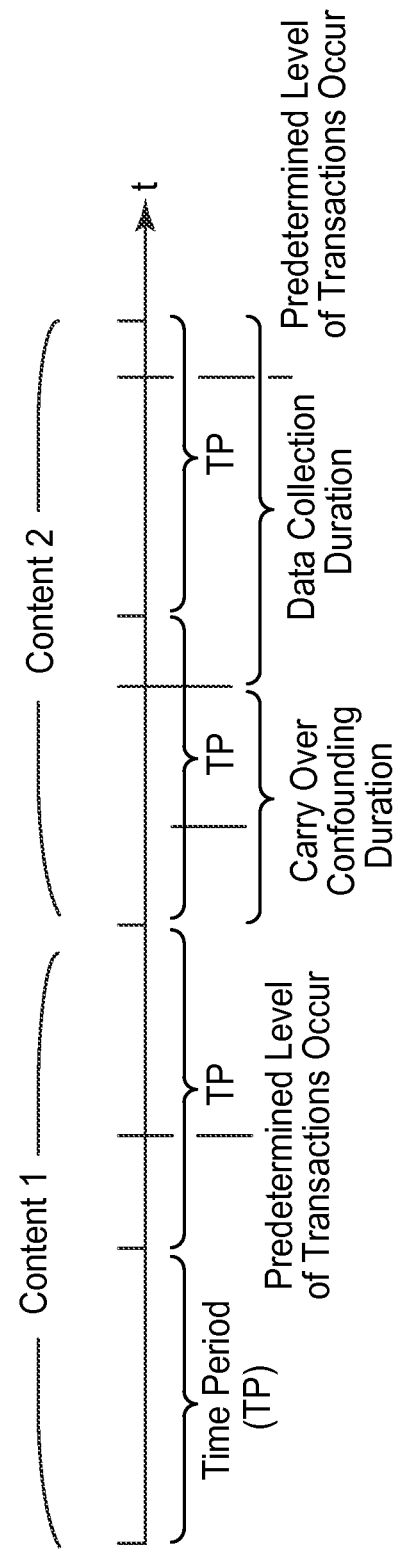
FIG. 2A
FIG. 2B

_US 11,062,328 B2_

SYSTEMS AND METHODS FOR TRANSACTIONS-BASED CONTENT MANAGEMENT ON A DIGITAL SIGNAGE NETWORK

BACKGROUND

Digital signage networks, typically including many displays, can be controlled electronically by one or more computers or processors. Digital signage networks can be used in both public and private environments, such as retail stores and corporate buildings. Content displayed on digital signage can be easily changed, in comparison with traditional static signs.

Digital signage networks are often used in retail environments. Visual and audio information distributed and presented on a digital signage network in a retail environment may take the form of advertising content and/or messages. Such content is designed to be persuasive, for example, to influence a viewer's attitudes, perceptions, and behaviors in order to create a positive business impact, such as increasing sales, strengthening brand awareness, or engendering consumer loyalty.

SUMMARY

In one embodiment, a method of determining how effective content of interest is in influencing viewer behavior comprises the step of displaying the content of interest according to a playlist on a display at a location; measuring data indicative of one or more specified transactions at the location while the content of interest is displayed; changing content displayed on the display in response to a predetermined level of the one or more specified transactions; and collecting data from the location including data indicative of activities occurring at the location while the content of interest is displayed, wherein the collected data is provided to determine an indication of the effectiveness of the content of interest to influence viewer behavior.

In another embodiment, a transaction-based content management system for a digital signage network having a plurality of displays at one or more locations, comprises a content controller, a transaction monitor coupled to the content controller, and a data acquisition unit coupled to the content controller. The content controller is configured to instruct a display at a location to display a first piece of content according to a playlist. The transaction monitor is configured to monitor transactions at the location and to send a signal to the content controller when a predetermined level of transactions is reached, wherein the content controller is further configured to instruct the display to display a second piece of content in response to the signal. The data acquisition unit is configured to collect data from the location including data indicative of activities during which the first piece of content is displayed.

In yet another embodiment, a method of determining how effective content of interest is in influencing behavior of viewers of content on a digital signage network having a plurality of displays dispersed at one or more locations, comprises the step of receiving data collected from a location indicative of activities occurring at the location while the content of interest was displayed on a display at the location, the data collected being collected for a period of time determined based on the basis of a predetermined level of one or more specified transactions being reached at the location; and determining how effective the content of interest is in influencing behaviors of viewers using the received data.

BRIEF DESCRIPTION OF THE DRAWINGS

The accompanying drawings are incorporated in and constitute a part of this specification and, together with the description, explain the advantages and principles of the invention. In the drawings.

FIGS. 2A and 2B are exemplary time sequences for content display;

DETAILED DESCRIPTION

Figure 1:
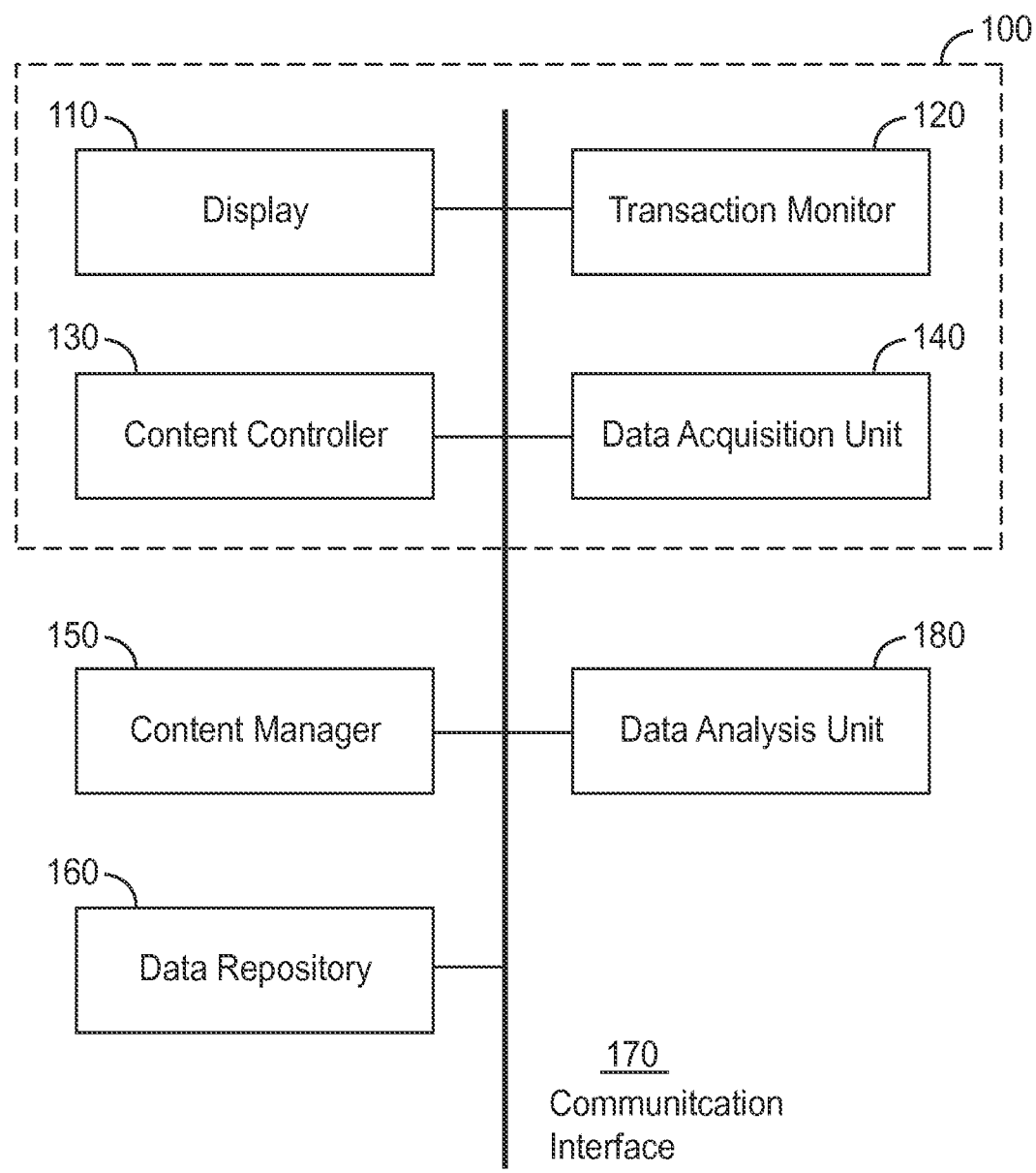
FIG. 1 illustrates an exemplary block diagram of a transaction-based content management system for a digital signage network.

A digital signage network, also referred to as a digital signage system hereinafter, is a system typically having a plurality of displays dispersed in a plurality of locations. Displays, also referred to as digital signage or players, in a digital signage system, can be any of the various types of electronic displays that are controllable by a computer or processor. Content being played on the displays typically include information, messages, and advertisements. Content may take many forms, including visual or aural, or any form that can impact or be detected by the human sensory system (e.g., the five senses of the human sensory system, including tactile or touch, taste, and smell, in addition to vision and hearing). Content may be static, dynamic or a combination thereof.

Content played on a digital signage network is usually designed to influence a viewer's decision making, which is often reflected in a viewer behavior. For example, an advertisement with a picture of a chocolate sundae is designed to encourage customers to buy a chocolate sundae. Data indicative of activities at a location during which a piece of content is displayed at the location can be collected and used to determine the effectiveness of the piece of content on influencing the viewer. However, confounding variables, which are factors that may also influence a viewer's decision making, in the digital signage network, may change the causation between the content and the behavior. Another advertisement of a tropical smoothie, as an example of a confounding variable, shown on either a same display or a display close by, may negatively influence a viewer's decision making of buying a chocolate sundae.

Systems and methods in the present disclosure generally apply experimental design principles to determine effectiveness of a piece of content. Various aspects of experiment design in a digital signage system are disclosed in details in commonly assigned U.S. Patent Application Publication No. 2010/0017288, entitled "Systems and Methods for Designing Experiments," U.S. Patent Application Publication No.

2009/0012848, entitled "System and Method for Generating Time-slot Samples to Which Content May be Assigned for Measuring Effects of the Assigned Content," U.S. Patent Application Publication No. 2009/0012927, entitled "System and Method for Assigning Pieces of Content to Time-slots Samples for Measuring Effects of the Assigned Content," and U.S. Patent Application Publication No. 2009/0012847, entitled "System and Method for Assessing Effectiveness of Communication Content," which are incorporated herein by reference in entirety.

The present disclosure is directed to systems and methods for controlling the timing, sequence, and location of content shown on displays to reduce the impact of confounding variables and to determine effectiveness of content on influencing viewer behavior on a digital signage network utilizing experimental design principles. Confounding variables in determining the effectiveness of displayed content in influencing behavior of those viewing the content can be reduced by timing the display of content based on the level of specified transactions. For example, one piece of content of interest may be displayed according to a playlist at the location. Data indicative of transactions at that location is measured while that piece of content is displayed. After a predetermined level of the specified transactions occur at the location, other content can be displayed. The effectiveness of the piece of content of interest in influencing viewer behavior can then be determined using data that is collected from that location. The data used includes data that is indicative of activities at the location where the piece of content of interest is displayed.

As noted above, the present disclosure is directed to the management of content displayed on a digital signage network based upon occurrence of transactions. In some embodiments, these transactions are financial transactions. In some cases, a transaction may be related to a viewer behavior that a piece of content is designed to influence. In some other cases, a transaction may not be related to a viewer behavior that a piece of content is designed to influence. For example, a transaction of interest may be 10 sales of chicken sandwiches at a quick-serve restaurant that has a display presenting an advertisement for chicken sandwiches, or may be 10 sales of any food at the restaurant. Data, including data indicative of activities, is collected at a location while the piece of content is displayed at the location. The piece of content is displayed at the location until a predetermined level of one or more specified transactions is reached. For example, an advertisement for a car service is displayed until the car service has been sold for a specified number of times. In some implementations, the location of interest includes several different places. For example, the location of interest may include a place outside a restaurant having a display with menu selections and a place inside the restaurant where customers make orders. As another example, the location could include both a place by a highway where a large sign indicates a gas station at the next exit as well as the actual gas station.

One of the benefits of transaction-based content management is that it helps provide that data gathered contains relevant data. For example, using this approach one can ensure that the data field for the data indicative of activities does not have many empty data cells, i.e., data cells with no relevant data. A data field having large number of empty data cells often affects the performance of data analysis. For example, it requires additional data manipulation in drawing statistical inferences on a set of data with a large number of empty data cells.

A wide variety of types of transactions may be used in managing content displayed on a digital signage network. As an example, transactions of interest for a quick-serve restaurant are illustrative of various aspects of transaction-based content management. In a quick-serve restaurant, sales often include not only specific items but also combinations and upgrades, a class of products (i.e., a product category, such as any kids' meals or any sandwiches), participation in promotions or other store initiatives such as charitable partnerships. As another example, transactions of interest for a hotel may be sales for room upgrades, room service, in-room internet access, and the like, or use of amenities such as workout rooms, pools, or lounges, visits to in-hotel restaurants or bars. As yet another example, transactions of interest for retail stores may be sales of specific items, sales of additions such as warranties or maintenance plans, traffic to different departments or areas of the store, or interactions with informational or promotional kiosks. As a further example, transactions of interest for car dealerships may be car sales, features upgrades, types of financing plans, or test drives taken. These are merely examples of various types of transactions of interest to facilitate better understanding of transaction-based content management. The present application is not limited to such examples.

In some implementations, the predetermined level of transactions may vary depending on day-parts, locations, types of products or services, and other factors. For example, the predetermined level of transactions for combo meals at a quick-serve restaurant may be sales of 20 combo meals from 9:30 A.M. to 11:30 A.M., while the predetermined level of transactions may be sales of 50 combo meals from 11:30 A.M. to 1:30 P.M. The predetermined level of transactions for chicken sandwich combos at the same quick-serve restaurant may be sales of 10 chicken sandwich combo meals from 9:30 AM to 11:30 AM. As another example, the predetermined level of transactions for oil-change services at a car dealer at a small town may be sales of 1 service while the determined level of transactions for oil-change services at a car dealer at a big city may be sales of 10 services.

In some embodiments, a processing unit receives data collected from a location indicative of activities occurring at the location while content of interest was displayed on a display at the location. The data is collected for a period of time determined based on the basis of a predetermined level of one or more specified transactions being reached at the location. Further, the processing unit determines how effective the content of interest is in influencing behaviors of viewers using the received data. In the present disclosure, a processing unit may be one or more of processors, computers, microprocessors, servers, computing devices, and the like.

FIG. 1 illustrates an exemplary block diagram of a transaction-based content management system 100 on a digital signage network. Those skilled in the art will appreciate that the transaction-based content management system 100 may be alternatively illustrated using different function blocks and that various components of the transaction-based content management system 100 may be implemented as hardware, software, firmware, or any combination of hardware, software and firmware. In one embodiment, the transaction-based content management system 100 includes one or more displays 110, a transaction monitor 120, a content controller 130, a data acquisition unit 140, and a data analysis unit 180. Optionally, the transaction-based content management system 100 may include content manager 150, and data repository 160. The transaction-based content management system 100 includes a communication interface 170 that provides communication means among the components of the system 100. The communication interface 170 includes both short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface 170 may be either within a private computer network, such as intranet, or on a public computer network, such as the internet.

The transaction-based content management system 100 illustrated in FIG. 1 may include functionality to automatically or semi-automatically generate playlists, which provide a list of the content to be presented, and schedules, which define an order for content presentation. In a semi-automatic mode, a user may access the content manager via a user interface. Assisted by the content manager 150, the user may identify content to be presented and generate playlists and schedules that control the timing and order of content presentations on one or more displays 110. Each display 110 presents content to recipients according to a playlist and schedule developed for the display. The content may comprise graphics, text, video clips, still images, audio clips, web pages, and/or any combination of video and/or audio content, for example.

In some implementations, after a playlist and schedule are developed, the content manager 150 determines the content required for the playlist, downloads the content from a content server, and transfers the content along with the playlist and schedule to a content controller 130 that distributes content to the displays 110. Although FIG. 1 shows only one content controller 130, multiple content controllers may be coupled to a single content manager 150. Each content controller 130 may control a single display or a plurality of displays 110. The content and/or the playlists and schedules may be transferred from the content manager 150 to the one or more content controllers 130 in a compressed format with appropriate addressing providing information identifying the display 110 for which the content/playlist/schedule is intended. In some applications, the displays 110 may be distributed in stores and the content presented on the displays 110 may be advertisements.

In other implementations, the content manager 150 may transfer only the playlists and schedules to the content controller 130. If the content is not resident on the content controller 130, the content controller 130 may access the data repository 160 to acquire the content to be presented. The content controller 130 may assemble the desired content, or otherwise facilitate display of the desired content on the players according to the playlist and schedule. The playlists, schedules, and/or content presented on the displays 110 can be modified periodically or as desired by the user through the content controller 130, or through the content manager 150, for example.

In yet other implementations, the content controller 130 creates the playlist and schedule for the one or more displays 110. If the content is not resident on the content controller 130, the content controller 130 may access the data repository 160 to acquire the content to be presented. The content controller 130 may assemble the desired content, or otherwise facilitate display of the desired content on the players according to the playlist and schedule. In some cases, the transaction-based content management system does not include the component of content manager 150. In other cases, the content manager 150 transmits one or more rules and constraints to the content controller 130, and then the content controller 130 generates the playlist and schedule based upon the rules. The rules and constraints are generated in accordance with experimental design principles. The rules may include, for example, the viewer behavior of each piece of content is designed to influence, the day-part that a piece of content should be presented or should not be presented, or the order in which the two pieces of content should be shown.

Both the content controller 130 and the content manager 150 may be any general purpose or application-specific computer or device. Both the content controller 130 and the content manager 150 may be a stand-alone computer, or a plurality of networked computers or devices. The content controller 130 may be set up locally with the one or more displays, or at a remote location. The playlists and schedules generated by either the content controller 130 or the content manager 150 and may follow the principles of experimental design, which are described further in details below.

In some implementations, the content manager 150 or the content controller 130 facilitates the development and/or formatting of a program of content to be played on a display. For example, the content controller 130 may facilitate formatting of an audiovisual program through the use of a template. The template includes formatting constraints and/or rules that are applied in the development of an audiovisual program to be presented. For example, the template may include rules associated with the portions of the screen used for certain types of content, what type of content can be played in each segment, and in what sequence, font size, and/or other constraints or rules applicable to the display of the program. A separate set of rules and/or constraints may be desirable for each display configuration. In some embodiments, formatting a program for different displays may be performed automatically by the content controller 130.

In some embodiments, the transaction-based content management system 100 may create templates, generate content, select content, assemble programs, and/or format programs to be displayed based on information acquired through research and experimentation in the area of cognitive sciences. Cognitive science seeks to understand the mechanisms of human perception. The disciplines of cognitive and vision sciences have generated a vast knowledge base regarding how human perceptual systems process information, the mechanisms that underlie attention, how the human brain stores and represents information in memory, and the cognitive basis of language and problem solving.

Application of the cognitive sciences to content design, layout, formatting, and/or content presentation yields information that is easily processed by human perceptual systems, is easy to understand, and is easily stored in human memory. Knowledge acquired from the cognitive sciences and stored in a cognitive sciences database (not shown in FIG. 1) may be used automatically or semi-automatically to inform one or more processes of the transaction-based content management system 100 including creation of templates, content design, selection of content, distribution of content, assembly of programs, and/or formatting of programs for display. The cognitive sciences database used in conjunction with the programming of the content management system 100 yields advertisements or other digital signage programs that are enhanced by the teachings of cognitive science, while relieving the system user from needing specific training in the field.

For example, the cognitive sciences database may store cognitive and vision science information that is utilized during the content design, distribution, and/or adjustment processes in order to provide content that is easily processed by human perceptual systems, easily comprehended, and easily stored in memory. The cognitive sciences database may include design rules and templates that may be implemented by a computer to develop and modify content in conformance with principles of cognitive and vision sciences. Cognitive sciences database may also include computer implementable models of principles of cognitive and vision sciences, such as models of visual attention, text readability, and memory principles.

In some embodiments, the data acquisition unit 140 is configured to acquire data indicative of activities. The data acquisition unit 140 may perform or facilitate acquisition of data via any means. For example, the data acquisition unit 140 may be coupled to various sensor or data acquisition devices that gather information including product movement, product sales, customer actions or reactions, and/or other information. Sensors may be used to detect, for example, if a customer picks up the product, or if a customer is in the vicinity of the display when the content is displayed. Sales may be determined based on information acquired by a point of sales (POS) system. One or more devices that validate the display of content may also be used. Changes in inventory levels of a product may be available via an inventory control system. Customer reactions may be acquired via questionnaires.

In some embodiments, the transaction monitor 120 is configured to monitor the occurrence of transactions. The transaction monitor 120 may use the same sensor and data acquisition device as in the data acquisition unit 140 to determine the occurrence of transactions. A transaction may be, for example, a single sales transaction. In some embodiments, the content controller 130 may control when the transaction monitor 120 on the start time of monitoring transactions. In some embodiments, the transaction monitor 120 sends a signal to the content controller 130 indicating an occurrence of a predetermined level of transactions. In some cases, the content controller 130 may change the content played on the display upon receiving the transaction occurrence signal, as illustrated in FIG. 2A. In some other cases, the content controller 130 may change the content played on the display some time after receiving the transaction occurrence signal. In an exemplary embodiment, the content controller 130 may use time periods with predetermined duration in generating schedules and the actual time of content-switching may depend on the end point of a time period, as illustrated in FIG. 2B. In some cases, the content controller 130, the transaction monitor 120, and the data acquisition unit 140 are local to the one or more displays 110. For example, these components reside in the same retail store, the same restaurant, the same building, or the same campus.

In some embodiments, the content controller 130 determines or receives a carryover confounding duration during which viewers are likely exposed to both a piece of content of interest and a prior piece of content. In some embodiments, the carryover confounding duration is determined based upon how long target viewers normally spend at a location that has a display on the digital signage network. In some cases, the carryover confounding duration is equal to the length of time that target viewers normally spend at the location. In some cases, the carryover confounding duration is shorter than the length of time that target viewers normally spend at the location. In some cases, the carryover confounding duration is longer than the length of time that target viewers normally spend at the location. In another embodiment, the content manager 150 determines the carryover confounding duration and passes the carryover confounding duration to the content controller 130. In a particular embodiment, the content controller 130 sends a signal to the transaction monitor 120 to start monitoring transactions after a piece of content has been played on the display for the carryover confounding duration such that carryover effects of previous content is reduced, as illustrated in FIGS. 2A and 2B.

In some embodiments, the content controller 130 may control the data acquisition unit 140 on collecting or labeling data corresponding to an occurrence of transaction. In one embodiment, the content controller 130 or the transaction monitor 120 sends a signal to the data acquisition unit 140 to indicate a transaction monitor start time. In some embodiments, the data acquisition unit 140 records the transaction monitor start time and transaction occurrence time along with the collected data. In some implementations, the transaction monitor unit 120 sends a signal to the data acquisition unit 140 indicating an occurrence of the predetermined level of transactions. In a particular embodiment, the data acquisition unit 140 outputs data indicating how long it has taken for a predetermined level of transactions to occur. In some embodiments, the data acquisition unit 140 outputs data including activity measurement data, transaction monitor start time, transaction occurrence time, data collection start time, data collection end time, and other types of data. In some cases, the data acquisition unit 140 stores all data in the data repository 160.

In some cases, the data acquisition unit 140 may be coupled to a data analysis unit 180 that is configured to analyze the data collected by the data acquisition unit 140. In some configurations, the data analysis unit 180 receives information regarding content from the content controller 130. In some other configurations, the data acquisition unit 140 may store the data collected in the data repository 160, while the content controller 130 may also store data regarding content in the data repository 160. In such configuration, the data analysis unit may retrieve data regarding content and collected data indicative of activities at a content display location from the data repository 160. The data analysis unit 180 may determine and/or quantify cause and effect relationships between a piece of content and the effectiveness of the content on influencing a view behavior.

In some embodiments, the collected data indicative of activities at a content display location is weighted when the data is used for content effectiveness determination. In one embodiment, the weighting can be based on the time at which a data point occurs relative to the display of potentially confounding content, and a function of the carryover confound duration. The carryover confound duration is based on information describing the likelihood that the data point could have been influenced by a piece of content displayed previously. For example, referring to FIG. 2A, point 20A and 20B are data points collected during the carryover confounding duration. The data collected at 20A, happening very early in the carryover confounding duration, is very likely to be contaminated, and thus is given little weight, for example, 20%. The data collected at point 20B is also within the carryover confound duration, but being later, is less likely to be contaminated and would be given more weight, for example 60%. Having occurred after the confound carryover duration, data points 20C and 20D could be weighted very heavily, at 95% or even 100%. Thus, the weighting approach is likely to reduce carryover effects by accounting for the likelihood of those carryover effects. In some implementations, a distribution curve of viewer visit duration may be obtained and the weighting can be based on the distribution curve of viewer visit duration. For example, a weighting factor may be 95% at a data point where the distribution curve of viewer visit duration is 95%.

FIG. 2B illustrates an exemplary embodiment of managing the schedule of content display. In one embodiment, a schedule comprises a plurality of time periods, each time period having a predetermined duration. In some embodiments, a content change will occur at the end of a time period, even if a predetermined level of transactions occurs in the middle of the time period; if, at the end of a time period, the a predetermined level of transactions has not yet occurred, the current content may continue to be displayed.

In some embodiments, the content manager 150 and the data analysis unit 180 may operate on a same or separate server or as a service provided over a computer network. Because the data analysis unit 180 will have received information regarding the piece of content and the data indicative of activities at a location where the piece of content is displayed, the analysis unit 180 would have much of the necessary information to choose the appropriate statistical test to apply to the collected data. For example, a t-test or a Chi-Squared test may be used for the inferential statistical test.

The data repository 160 may be any non-transitory computer readable medium. For example, it may be random access memory, a flat file, a XML file, or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. Data repository 160, for example, may be a single relational database such as SQL Server from Microsoft Corporation. In some cases, data repository 160 may be a plurality of databases that may exchange and aggregate data by data integration process or software application. In an exemplary embodiment, part of the data repository 160 may be hosted in a cloud data center.

The data repository 160 provides data storage for the transaction-based content management system 100. In some cases, the data repository 160 may run on a single computer or storage device. In some other cases, the data repository 160 may run on a series of networked computers, servers, or devices. In some implementations, the data repository 160 includes tiers of data storage devices including local, regional, and central. In some embodiments, the data repository 160 provides data storage for content related data, for example, such as pieces of content, content rules, content templates, and the like. In some embodiments, the data repository 160 provides data storage for transaction related data and acquisition related data, for example, such as data collected by the data acquisition unit 140, the transaction occurrence time, and the like. In some other embodiments, the data repository 160 provides data storage for analyzed data, for example, such as content effectiveness data and the like.

Distributing content may be effected in many ways, including electronically, optically, audio broadcasting, or graphically or pictorially via static or dynamic images, for example. Content may be distributed to and within a variety of physical environments, including retail stores, banks, hotels, airports, roadways, railways, and other public or private spaces. Content may be presented via stationary or mobile structures, devices, and systems.

Figure 3A:
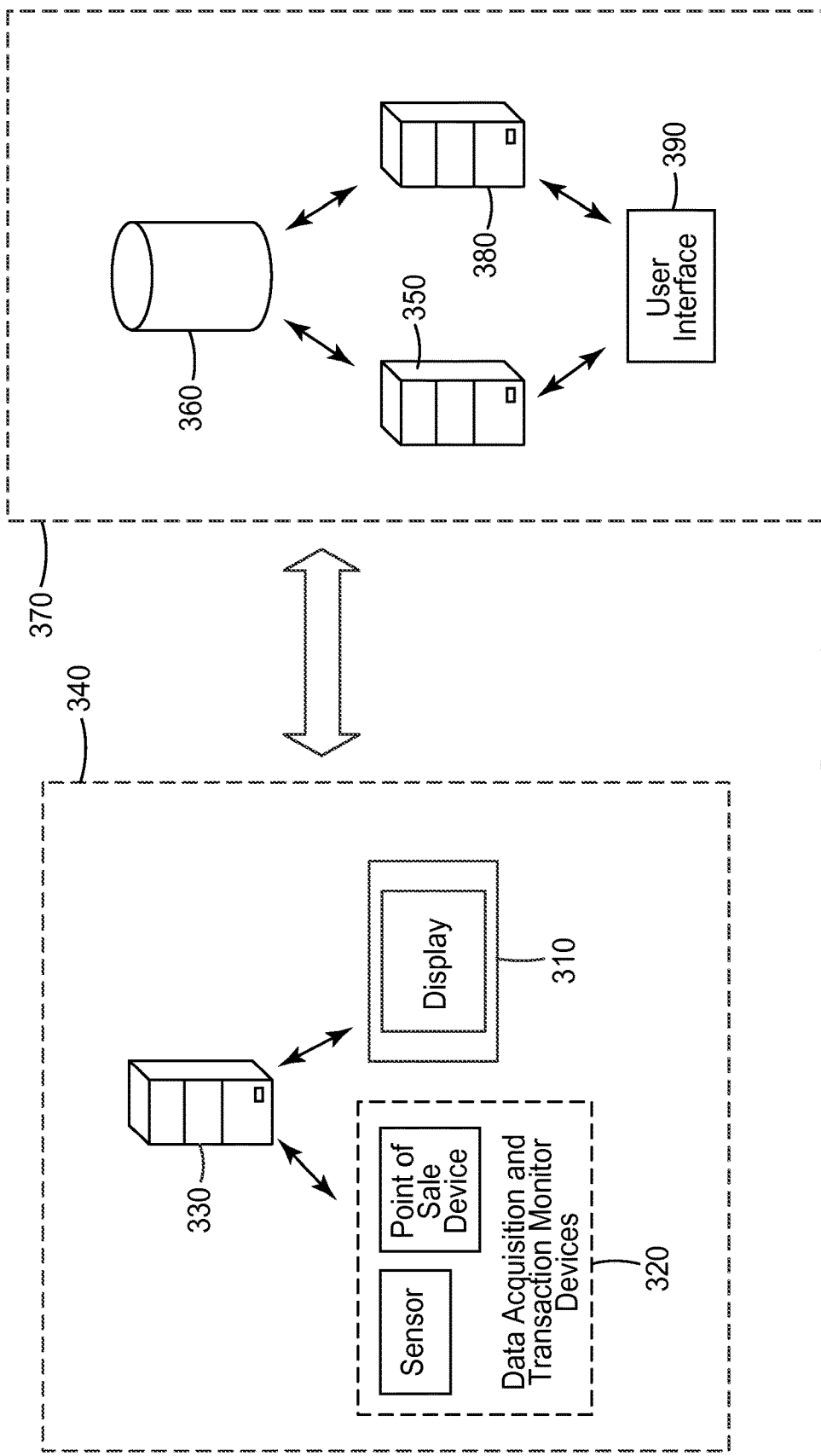
FIG. 3A is a system diagram of an exemplary transaction-based content management system.

FIG. 3A illustrates an exemplary system diagram of a transaction-based content management system 300. In one embodiment, the transaction-based content management system 300 comprises a local content control system 340 and a remote content and data management system 370. The local content control system 340 typically comprises a content controller 330, a display 310, and a data acquisition and transaction monitor unit 320. The local content control system 340 may comprise one or more displays 310 scattered across one or more locations. Here, a location may refer to a retail store, a quick-serve restaurant, a car dealership, a reception area of a building, or a floor of a hotel, for example. The content controller 330 determines content and timing of content presentation for each display 310. The content controller 330 may control each display 310 through either short-range or long-range communication interfaces.

The data acquisition and transaction monitor unit 320 acquires data indicative of activities. Activities of interest, for example, may be a purchase, a person's movement such as moving direction and moving speed, a person's position, or an action such as picking up an item. In this example, the data acquisition and transaction monitor unit 320 may include one or more sensors to detect persons' movements, positions, and actions, or a point of sale system (POS). The content controller 330 interacts with the data acquisition and transaction monitor unit 320 via short-range communication interfaces and/or long-range communication interfaces.

The remote content and data management system 370 manages content and process data across multiple locations on a digital signage network. The local content control system 340 and the remote content and data management system 370 interact via short-range communication interfaces and/or long-range communication interfaces. In some embodiments, the remote content and data management system 370 comprises a content manager 350, a data repository 360, a data analysis unit 380, and a user interface 390.

In some embodiments, the content manager 350 composes rules for content display according to experimental design principles and distributes the rules to the one or more content controllers 330 dispersed in multiple locations. In some other embodiments, the content manager 350 may compose playlists and schedules for each location and distributes the playlists and schedules to the one or more content controllers 330 dispersed in multiple locations.

The data repository 360 fulfills the data storage needs for the transaction-based content management system 300. The data repository 370 may store data acquired by the data acquisition and transaction monitor unit 320 dispersed in multiple locations. The data repository 360 may store rules for each location or schedules and playlists for each location. Further, the data repository 360 may store content related information, such as rules applying cognitive science to a store location, content templates, pieces of content, and other information.

The data analysis unit 380 analyzes data acquired by the data acquisition and transaction monitor unit 320 dispersed in multiple locations and determines content effectiveness. Both the content manager 350 and the data analysis unit 380 may allow interaction with user interface 390 via long-range and/or short-range communication interfaces. The user interface 390, for example, may display the content effectiveness report to a user. As another example, the user interface 390 may allow a user to revise content display rules applying the experimental design principles. Both the content manager 350 and the data analysis unit 380 may be implemented on one or more personal computers, servers, and other computing means.

In some cases, the content controller 330 determines a start time for transaction monitoring and data collection period and sends a signal to the data acquisition and transaction monitor unit 320 upon the start time. In some configurations, the start time of the transaction monitoring and data collection period is determined based upon the end time of the prior content and a carryover confounding duration. For example, the start time of the data collection period may be separated from the end time of the prior content by the confounding duration, as illustrated in FIGS. 2A and 2B.

In some embodiments, the data acquisition and transaction monitor unit 320 notifies the content controller 330 of the occurrence of a predetermined level of transactions. In some configurations, the content controller 330 changes content on the one or more displays 310 upon such notification, as illustrated in FIG. 2A. In some cases, the data acquisition and transaction monitor unit 320 may acquire data indicating how long it takes for the predetermined level of transactions to occur and the data analysis unit 380 determines effectiveness of content based upon the data. For example, content A and content B both influence viewers' decision on buying chicken sandwiches. A predetermined level of transactions is defined as selling 50 chicken sandwiches. If the length of time for the predetermined level of transactions to occur when content A is displaying is 120 minutes and the length of time for the predetermined level of transactions to occur when content B is displaying is 140 minutes, content A is likely more effective than content B.

In some other configurations, the content controller 330 changes content on the one or more displays 310 when a fixed time period ends after a transaction notification by the data acquisition and transaction monitor unit 320, as illustrated in FIG. 2B. In such configurations, the data acquisition and transaction monitor unit 320 may acquire data indicating how long it takes for the predetermined level of transactions to occur and the data analysis unit 380 determines effectiveness of content based upon the data, similar to the procedure describe above. Alternatively, the content controller 330 may send a signal to the data acquisition and transaction monitor unit 320 to end the data collection period upon the end time of the content, as illustrated in FIG. 2B. In this case, the data acquisition and transaction monitor unit 320 may acquire data indicative of activities and the length of time for the data collection period. The data analysis unit may determine content effectiveness based on both the data indicative of activities and the length of time for the data collection period. For example, content A and content B both influence viewers' decision on buying chicken sandwiches. A predetermined level of transactions is defined as selling 50 chicken sandwiches. When content A is displaying, there are 52 sales during the 140 minutes data collection period. When content B is displaying, there are 56 sales during the 100 minutes data collection period. The data analysis unit 380 analyzes both sets of data and determines that content A is likely less effective than content B on influencing viewers' purchase decisions because sales per unit time related to content A is less than sales per unit time related to content B.

Figure 3B:
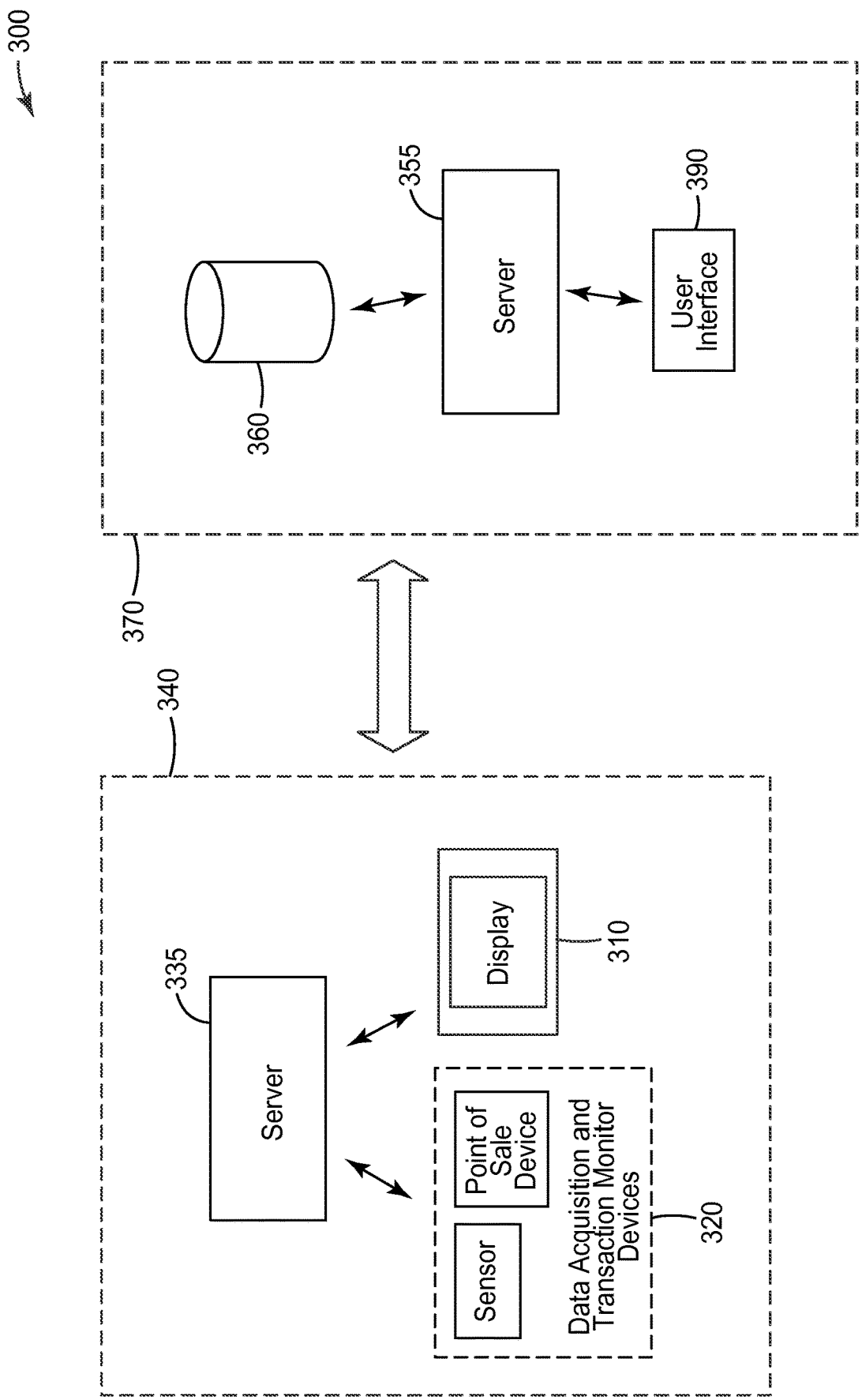
FIG. 3B is another exemplary system diagram of a transaction-based content management system.

FIG. 3B is a system diagram of a particular embodiment of a transaction-based content management system. In this embodiment, the remote content management system 370 may include a content manager 355, which also hosts a data analysis unit. In some implementations, the local content control system 340 may include a content controller 335 that also hosts a local content storage, which maintains an inventory of content elements and pieces of contents. In some other implementations, the local content storage resides in a different device from the content controller 335. In some embodiments, the content controller 335 defines schedule and playlists for the one or more displays 310. The content controller 335 may retrieve contents from the local content storage while it delivers contents to the one or more displays 310.

Figure 4:
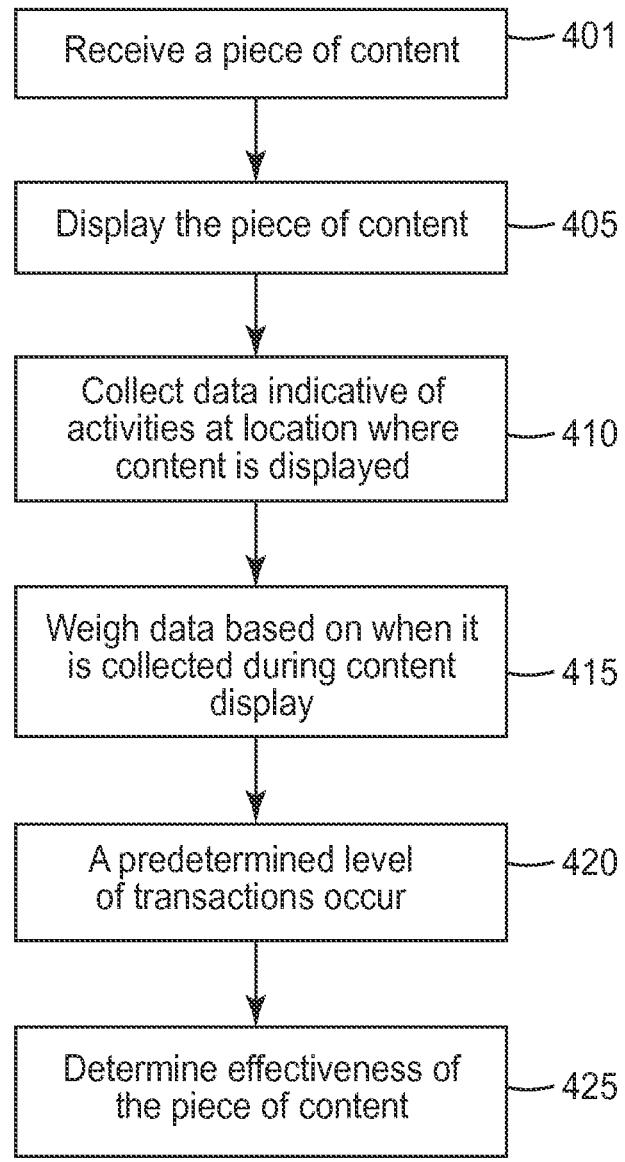
FIG. 4 is an exemplary logical flowchart for a transaction-based content management system.

FIG. 4 is an exemplary logical flowchart for a transaction-based content management system. Initially, a piece of content is received and a definition of a predetermined level of transactions is received (step 401). In some cases, the transactions to be monitored may be defined by either the content controller 120 or the content manager 150, referring to FIG. 1. In some other cases, the predetermined level of transactions may be defined with user input via a user interface. In some cases, the piece of content may be designed by the content controller or the content manager. Next, the piece of content is presented on a display at a location on the digital signage network (step 405). Data indicative of activities is collected at the location where the piece of content is displayed (step 410). The collected data is either sent to a data analysis unit or stored in a data repository to be analyzed later. Optionally, the collected data is weighted based upon when it is collected during the duration over which the piece of content is displayed (step 415). The content display and the data collection process continue until a predetermined level of transactions is detected (step 420). In some cases, the transaction occurrence may be determined based upon the collected data. In some cases, the transaction occurrence may be determined based upon the weighted data. For example, the data collected is the number of sales of chicken sandwiches, and the transaction monitored is the sales of chicken sandwiches. As another example, the data collected is the number of sales of chicken sandwiches, and the transaction monitored is the amount of sales of the entire restaurant. The data collection period ends after the predetermined level of transactions is detected. In some cases, the data collection period ends right after the predetermined level of transactions is detected. In some other cases, the data collection period ends at a time after the predetermined level of transactions is detected. Optionally, the content presented at the display may be changed when the data collection period ends. The effectiveness of the piece of content on influencing viewer behavior is determined, based upon either the collected data or the weighted data (step 425).

Figure 5:
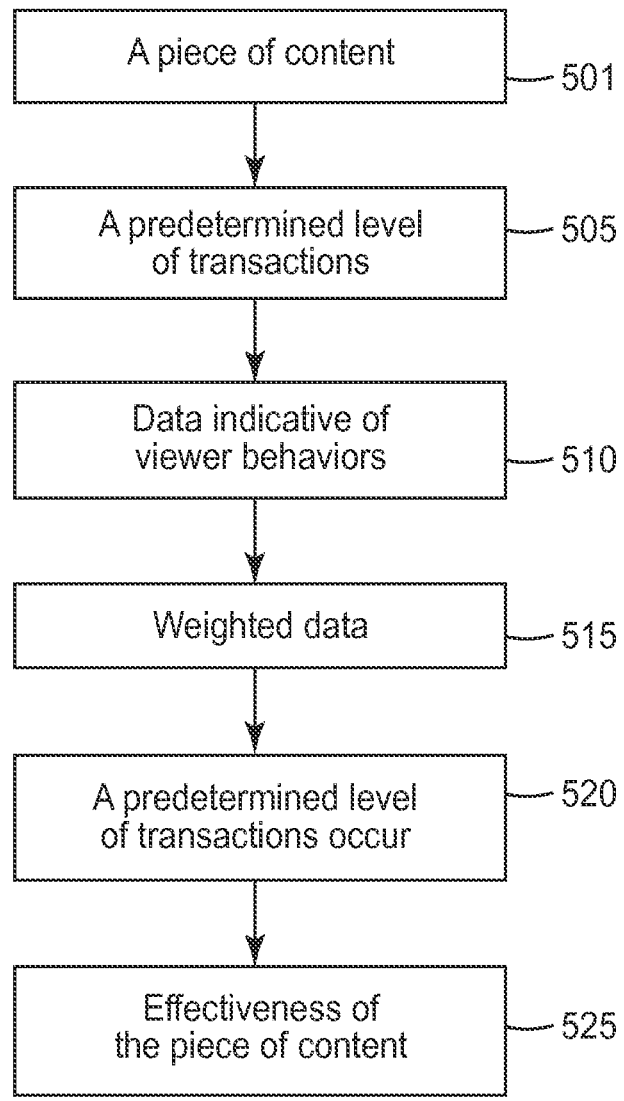
FIG. 5 is an exemplary data flowchart for a transaction-based content management system.

FIG. 5 is an exemplary data flowchart for a transaction-based content management system. Initially, a piece of content is received (step 501). The piece of content is designed to influence a viewer behavior. Next, a definition of a predetermined level of transactions is received (step 505. Data indicative of viewer behaviors at a content display location is collected when the piece of content is presented (step 510). Viewer behaviors are activities of viewers at a location where the piece of content is displayed; however, some of the so-called viewers may not actually see the piece of content. Optionally, the collected data is weighted based upon when it is collected during the duration over which the piece of content is displayed (step 515). The data collection period ends in response to a predetermined level of transactions (step 520). The data collection period may end immediately after a predetermined level of transactions is detected, or may end some time after a predetermined level of transactions is detected. The effectiveness of the piece of content is determined based upon the collected data or the weighted data (step 525).

Table 1 illustrates an exemplary transaction-based content management algorithm.

TABLE 1

The algorithm to conduct transaction-based content management is:

- Calculate ClearoutDuration, based on Viewer Visit Duration
- Receive experimental content and a definition of a predetermined level of transactions.
Content Display (Can be playlist-based or rule-based)
- For Playlist-based Content Display:
  ○ Receive constraints for the playlist
  ○ Populate playlist with experimental content and non-related content satisfying the constraints
  ○ If needed, wait for end of prior time period
  ○ Begin display of playlist
  ○ If playlist ends before the predetermined level of transactions occurs, begin displaying the playlist again
- For Rule-based Content Display:
  ○ Receive rules and constraints for playlist generation
  ○ Select a legal pool of pieces of content, including the experimental content and excluding other content related to the experimental content
  ○ Select a piece of content to display from the legal pool of pieces of content
  ○ If needed, wait for end of prior time period
  ○ Display the first selected piece of content
  ○ Use the rules to select another piece of content and display that at the conclusion of the currently displayed piece of content in accordance with the constraints
Monitor Transaction
- Begin content display
- After ClearoutDuration has passed
  ○ Record transaction monitor start time
- Collect data indicative of activities
- Monitor the occurrence of transactions
- When the collected data includes an occurrence of transaction, record the occurrence.
- Compare the number of recorded occurrences to the predetermined level of transactions
- If the recorded occurrences meet or exceed the predetermined level of transactions:
  ○ End content display.
  ○ Record duration since transaction monitor starts and associate the duration with the experimental content.

Content Management

Referred back to FIG. 1, the content manager 150 and/or the content controller 130 generates rules, playlists, schedules for content playing at one or more locations, or at all locations on a digital signage network according to experimental design principles. Using systems and methods of the present invention, it is possible to systematically control the pattern (i.e., timing and location) at which digital signage content is presented across the digital signage network in order to reduce confound effects.

The business world's demand for more data-driven marketing effectiveness has increased significantly in recent years due to the vast amounts of money spent on communication and the present inability to accurately understand the cause and effect relationship between content being communicated and its effectiveness on the recipient. Even if some degree of causality could be revealed using conventional marketing research techniques, the results of the research are typically not available until well after a marketing campaign has been completed. As such, these research results do not provide actionable intelligence when it would have the greatest value, i.e., while there is still an opportunity to make adjustments and maximize the results of the campaign. These and other circumstances have heightened the importance of marketing research to help identify communication concepts, validate these concepts and, after being produced and distributed, to measure and evaluate their effectiveness, within a useful time frame.

There are two major classes of research: experimental and non-experimental. The present disclosure is generally directed to systems and methods for conducting "true" experimental research. However, while systems and processes of the present invention described herein find particular usefulness when used as part of a true experiment, many of the systems, processes, and methodologies described herein find usefulness and value outside the context of a true experiment.

For example, various aspects of the systems and processes described as part of a true experiment may be implemented in quasi experiments, correlational studies, or other forms of non-experimental research. Implementing various system aspects and methodologies described herein can significantly improve the efficiency and accuracy of non-true experimental systems and methodologies. It is therefore to be understood that the processes, methodologies, systems, and devices described herein are not limited to use only within the context of true experimental research, but may be used advantageously in other forms of research, such as non- or quasi-experimental research and correlational studies.

Experiments are typically conducted to determine empirically if there are relationships between two or more variables, and typically begin with the formation of one or more hypotheses positing that there is a relationship between one or more independent variables and one or more dependent variables. For example, a content designer or retail marketer might formulate a hypothesis that a piece of advertisement content will be related to the increase of sales of the advertising products. Various types of experiments may be distinguished by the manner and degree to which they are able to reduce or eliminate the effects of confounding variables. Confounding variables are factors that could vary systematically with the levels of the independent variable. Only "true experiments," however, can empirically determine causation, which is why the Food and Drug Administration requires that "true experiments" be used to provide data regarding the effectiveness of new drugs, for example.

Independent variables are the variables defined or manipulated by the experimenter during an experiment. For example, independent variables may be the pieces of content and the length of content display time. Dependent variables are the variables posited to be predicted by the value of the independent variable, such as the increase of sales or a shorter time to reach a certain number of sales. The experimenter then conducts an experiment to determine if there is indeed a relationship between the independent and dependent variables, such as if the piece of content presented is related to the increase of sales of a certain item.

Confounding variables may also influence the dependent variable. These confounding variables are not of primary interest in the experiment, yet can influence the dependent variables and therefore obscure an accurate cause and effect relationship between the independent and dependant variables. The experimenter is trying to understand the causal relationships between the independent and dependent variables, however, these confounding variables can render the results of an experiment uninterpretable. Some examples of confounding variables include Hawthorne effects, order effects, carryover effects such as between-location confounds and within-location confounds, demand characteristics, and/or any other factor that could vary systematically with the levels of the independent variables.

Confounding variables make it difficult or impossible to know which factor (variable) caused any observed change in the dependent variable(s). The existence of confounding variables that are not properly controlled during the experiment renders it difficult or impossible to make statistical inferences about causal relationships between the independent and dependent variables.

Various types of experiments may be distinguished by the manner and degree to which they are able to reduce or eliminate the effects of confounding variables. The only research methodology that reliably reveals causality is true experiments. The term "true experiment" denotes an experiment in which the following three characteristics must exist:

1. There are at least two levels of an independent variable.
2. Samples are randomly assigned to levels of the independent variable. That is, each sample in the experiment is equally likely to be assigned to levels of the independent variable.
3. There is some method of controlling for, or eliminating, confounds.

The Internet has seemingly established itself as offering the "gold standard" of measurable marketing communication because it provides a "closed loop" in which a marketing message can be distributed, and a consumer's response can be observed and tracked. Most often, the response takes the form of a mouse click or a series of mouse clicks, or a duration of time spent on a web page, or some other metric that is tracked by a plethora of monitoring services that use "cookies" set on an individual's computer, that track their online behaviors.

Extremely sophisticated analytical capabilities have been developed by several prominent Internet media companies and by specialized Internet-focused marketing analytics firms. These capabilities include algorithmic distribution of myriad message versions combined with so called "real-time" tracking of user responses revealing correlations between message versions and performance metrics, such as click-through rates. Significant effort continues to be focused on enhancing and expanding these capabilities, and its value has been validated by the marketplace, as evidenced by recent high-profile, multi-billion dollar acquisitions.

While the Internet-style measurement approach is technically complex, it is conceptually simple. When a person views Internet content on some form of display device, the person's responses are almost exclusively limited to reacting using that same device. As such, the Internet's closed loop is extremely straightforward.

In experimental terms, individual users are the samples, and the various versions of web pages correspond to the independent variables. Mouse-clicks are the response, and click-data correspond to the dependent variable. The dependent variable data are actually generated by clicking on the independent variables, and as such, the very act of collecting dependent variable data necessarily connects the dependent variable data with the independent variables.

There is typically an extremely detailed physical record, enabled by cookies, that identifies a user and tracks his or her Internet click paths, noting which levels of the independent variables to which users were exposed. Importantly, it is rare for confounding variables to exist between the dependent variable and the independent variables.

In stark contrast, delivering content on displays within physical environments is rife with potential for confounds that do not exist within the Internet domain. In a physical environment, although people are generating dependent variable data (e.g., point-of sale or POS logs, satisfaction survey responses, sensor events), it is difficult to connect the dependent variable data to the levels of the independent variables (e.g., content on displays) to which they might have been exposed. Consumers wander through stores and may or may not notice the displays or the content playing on them. Moreover, the content played may change while the consumer is within viewing range, thus exposing them to multiple levels of the independent variable. Furthermore, many other variables might influence dependent variable data, ranging from more-or-less predictable variables, such as changing hotel occupancy rates or seasonal temperature variances, to the unpredictable, such as competitive marketing promotions and road construction.

Two types of confounds within the physical environment present extremely difficult measurement-related challenges: Between-location confounds and within-location confounds, also referred to as between-location and within-location carryover effects. It is possible to have both within- and between-location carryover effects. Within-location carryover effects occur when viewers who were present during one experimental condition (e.g., while control content is displayed) are still present during a different experimental condition (e.g., when experimental content is displayed). Between-location carryover effects occur when viewers at one location act on the content at a different location.

Figure 6A:
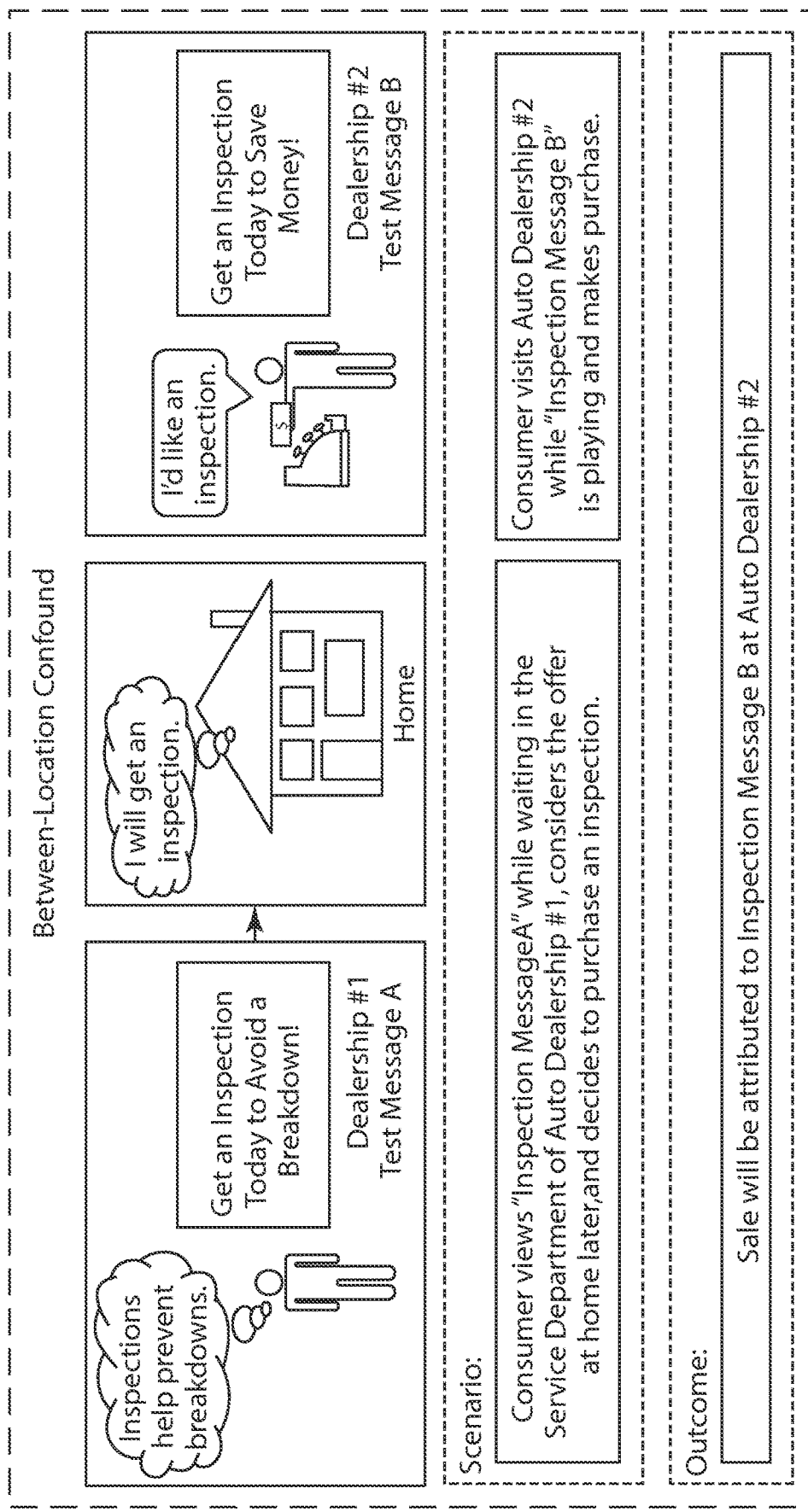
FIGS. 6A and 6B are illustrations that facilitate an understanding of between-location confounds and within-location confounds, respectively, in the context of embodiments of the present invention.

The following example facilitates an understanding of between-location confounds, a depiction of which is shown in FIG. 6A. Consider a circumstance in which a consumer visits an automobile dealership located near her workplace and views a message on a display promoting automobile inspections. The consumer does not purchase an inspection before leaving the dealership (i.e., she does not respond to the message). While driving home that night, the consumer considers the inspection message, and decides to stop at a different dealership location near her home, and purchases an inspection. But, the second dealership has been playing a different version of the message on its display. In this instance, the inspection sale will be attributed to the wrong message.

Figure 6B:
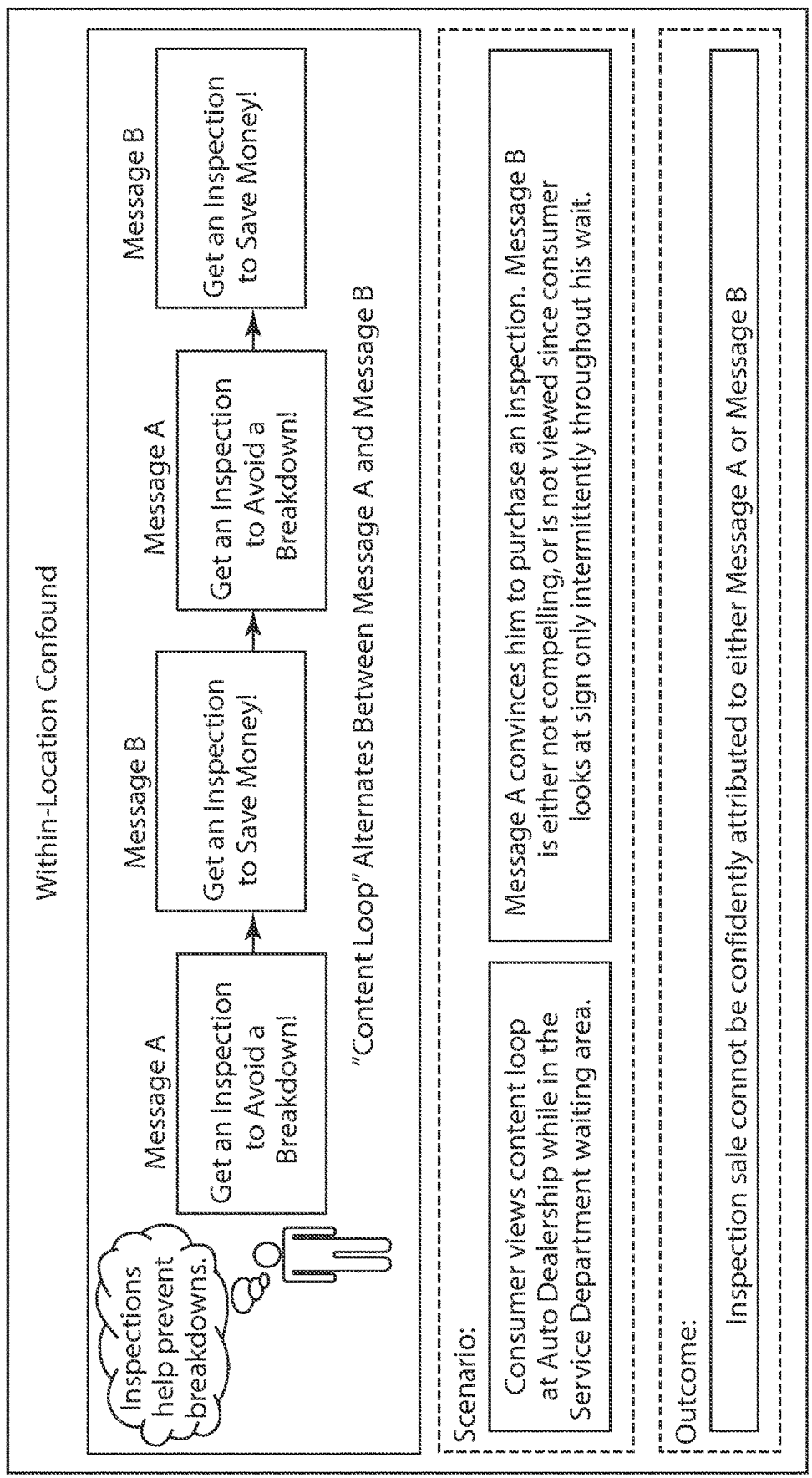

The following example facilitates an understanding of within-location confounds, a depiction of which is shown in FIG. 6B. Consider a circumstance in which a consumer visiting an automobile dealership views a message on a display promoting vehicle inspections by suggesting that the consumer can avoid a breakdown in the future. Yet, while the consumer considers this promotional offer, a different inspection-related message about saving money is played on the same display, which she may or may not view. The consumer decides to purchase an inspection based upon the original "avoid a breakdown" message but makes the purchase while the "saving money" message plays. In this instance, it is impossible to know to which message the purchase should be attributed.

The present disclosure relates to methods and systems that provide for determining the existence of, and measuring the strength of, cause-and-effect relationships between content being communicated and its effectiveness on recipients. The present disclosure is directed to methods and systems that manage content presentation and assessment of the effectiveness of the content. Methods and systems of the present invention are directed to aspects of presenting content in a manner such that the presentation pattern enables measuring of content effectiveness. Methods and systems of the present invention provide for systematic control of the pattern (i.e., timing and location) in which content is presented in order to control for and reduce confounds.

System and methods of the present invention are further directed to the presentation of content and to assessing effectiveness of such content consistent with constraints of a true experiment. Embodiments of the present invention are directed to providing, for use in a computer-implemented process, rules for displaying content consistent with constraints of a true experiment. The rules, which may be time based or event driven, preferably control or eliminate confounds, such as carryover effects. The content is displayed according to the rules. Data relating to effectiveness of the content is collected, and the effectiveness of the content is evaluated based on the collected data.

While digital signage networks, for example, present many challenges, such networks also offer ideal conditions for experiments than other media, such as broadcast or cable television, radio, and print. With regard to television and radio, for example, advertisers cannot control which televisions play their commercials (i.e., manipulate independent variables), and they cannot measure the direct effect of the commercial on product sales (i.e., measure effects of the independent variable on the dependent variable). Since most marketing research methodologies have evolved from these media models, market researchers appear to have overlooked the possibility of conducting true experiments.

Digital signage networks, by way of further example, allow precise scheduling of advertising content (i.e., the ability to precisely manipulate independent variables). And, because displays are typically near the product or otherwise in an environment in which changes in behavior can be measured, it is possible to measure behavioral changes that arise from the content (i.e., it is possible to measure effects of the independent variable on the dependent variable). Also, data used to evaluate success against objectives are typically already collected in a form that can be readily used within the experiment.

According to methodologies of the present invention, the independent variable is preferably digital signage content and the dependent variable may be any measure with business implications (e.g., sales data, sensor data, survey data). Using systems and methods of the present invention, it is possible to systematically control the pattern (i.e., timing and location) at which digital signage content is presented across the digital signage network in order to control for and reduce confounds.

In the context of various embodiments of the present invention, the independent variables correspond to the properties of the content, such as a strategic message or even an executional element like a dominant color or use of a photographic image. There are always at least two levels of the independent variable: either both are experimental content or one level is experimental and one is control content. Experimental content is the content that is hypothesized to have an impact on the dependent variable (analogues to the drug or drugs being tested in a clinical drug trial experiment). Control content is any content that would not be expected to impact the dependent variable (analogous to a placebo pill in a clinical drug trial experiment). Other than content designed to influence viewer behavior, control content (i.e., the placebo) may also be used in content management. Manipulating the independent variables involves assigning either experimental or control content to be presented on signs at different times and different locations. The different levels of the independent variables are randomly assigned (with constraints, as described below) to the different signs and different locations. The dependent variables can be any variable that would be posited to be impacted by the content (e.g., sales data, sensor data measuring pre-purchase behavior, duration for a predetermined level of transactions to occur).

Confounding variables, as discussed above, may influence the dependent variable and therefore obscure an accurate cause and effect relationship between the independent and dependant variables. If the experiment is double-blind, for example, and given proper randomization, there are only two categories of possible confounds; carryover effects (e.g., between- and within-location confounds), which are described above, and content confounds.

Content confounds occur when more than one version of experimental content for the same dependent variable is played at the same time during which measurement of the dependent variable is being measured. Such instances render it impossible to know which content underlies any observed change in the dependent variable. These types of confounds may be eliminated by ensuring that, at a given time, only experimental and/or only control content is presented.

As previously discussed, carryover effects occur when it is possible for a viewer to observe content at a time corresponding to an experimental condition and act on the content associated with a different experimental condition (e.g., when another piece of content is displayed). Again, such instances render it impossible to know which content underlies any observed change in the dependent variable. Within-location carryover effects occur when viewers who were present during one experimental condition (e.g., while control content is displayed) are still present during a different experimental condition (e.g., when experimental content is displayed). Within-location confounds may be controlled by designing the scheduling such that that the content display duration are sufficiently long to ensure that during part of the content display duration (e.g., half of the duration), the majority of the viewers (e.g., 95% or 75%) present at the viewing location were not present during the period when the previous content was displayed. In this case, data is only recorded during the portion of the content display duration in which the majority of viewers who would have been present when the previous content was displayed would have left the location. Furthermore, any still existing within-location carryover effects (e.g., those that would arise from the viewers that would have been exposed to both versions of content) may be eliminated by counterbalancing the order in which content is presented (e.g., ensuring that content B follows content A as often across the experiment as content A follows content B).

Between-location carryover effects occur when viewers at one location act on the content at a different location. Between-location carryover effects may be eliminated by ensuring that locations within plausible traveling distance of each other are constrained in the content they play such that it is not possible to leave one location while one experimental condition is in force and go to a nearby location and act in ways that affect the dependent variable(s) while other experimental content is in force.

Two types of blocking may be employed for different reasons; blocking by optimization factors and blocking by noise variables. Optimization factors are those factors at the signage location that might have implications for the effectiveness of the content. Such factors include signage location, ambient lighting, socioeconomic status of viewers, dayparts, and the like. Blocking by these factors allows for factorial analyses to measure interactions between content and optimization factors (e.g., measuring whether content A is more effective in the morning whereas content B is more effective in the evening). Blocking by noise variables can be used to increase statistical power by eliminating variability associated with factors that impact the dependent variable that are predictable but that are of no interest with respect to the experiment.

It is noted that, given proper randomization, it is impossible for any factor outside of the experiment (e.g., change in demand, road construction, other advertising efforts) to vary systematically with the level of the independent variable. In a double-blind experiment, neither the subjects (in this case, customers) nor the researchers know who belongs to the control group and the experimental group. Only after all the data are recorded, and in some cases analyzed, do the researches learn which individuals are in each respective group. Performing an experiment in double-blind fashion represents one way to lessen the influence of the prejudices and unintentional physical cues on the results (the placebo effect, observer bias, and experimenter's bias).

Creation of a playlist involves algorithmically assigning content to time-slot samples such that the content presentation pattern (i.e., timing and location at which content is played) meets the constraints of the experiment. This may be accomplished, for example, by ensuring experimental and control content is not confounded, blocked by other factors that can be controlled and predicted but that are otherwise not of interest in the study (i.e., noise factors), counterbalancing for order effects, randomizing across uncontrolled factors, and ensuring that the design is balanced such that there is roughly an equal number of time-slot samples across blocks. For an experimental period to evaluate the effectiveness of a piece of content, the transaction-based content management system will create a playlist including the piece of content and excluding any other content that may confound the measurement of the business goal. The playlist can either be dynamically generated based on weights, rules and probabilities, or a set list can be created and repeated for the duration of the test period is.

For example, there are 4 pieces of content currently in the system, each having an associated business goal in parenthesis:
  Drinks (soda sales)
  Combo Meals (combo meal sales)
  Fries (fry sales)
  Burgers (burger sales)

The transaction-based content management system is used to test the effectiveness of a new piece of content with its business goal in parenthesis:
  BurgersNew (burger sales)

Based on constraints, for an experimental period testing BurgersNew it will create a playlist including the experimental piece of content and excluding any other content that may confound the measurement of the business goal, in this case burger sales, meaning the playlist will not include the original Burgers content. An exemplary playlist is provided in Table 2 below.

TABLE 2

| 1 | 2 | 3 | 4 | 5 | 6 | 7 | 8 | 9 |
|---|---|---|---|---|---|---|---|---|
| Fries | BurgersNew | Combo | BurgersNew | Drinks | Fries | BurgersNew | Combo | Drinks |

Table 3 is an example of rules and constraints for dynamic playlist creation and testing BurgersNew in a similar amount to the prior set playlist and without playing pieces back-to-back.

TABLE 3

1. Combo - 22%
2. Drinks - 22%
3. Fries - 22%
4. Burgers - 0%
5. BurgersNew - 34%
6. If content was just played, re-do selection until a valid piece of content is chosen.
7. Continue selecting new content to play until the predetermined level of transactions occurs and new rules provided.

In a particular embodiment, the predetermined level of transactions is defined in a manner that a piece of content will be displayed for a sufficiently long time so a viewer is likely to be exposed to the piece of content before an expected viewer behavior is observed. In some embodiments, a piece of content is preferably to be displayed for at least twice of the viewer visit duration that target viewers normally spend at a location.

In an exemplary embodiment, the transaction-based content management system is used at a business where viewer behaviors happen at a low frequency. For example, the transaction-based content management system is used at a chain of car dealerships and the viewer behavior is to purchase a car maintenance service. In this embodiment, the definition of a predetermined level of transactions received by the system can be an single occurrence of a transaction such as a sale, since the transaction occurs at a sufficiently low frequency that it is unlikely to overwhelm the system with a series of threshold transaction occurrence triggering changes in content. For example, a predetermined level of transactions is defined as a sale of 30,000 miles maintenance service package. After receiving that definition, the transaction-based content management system displays a piece of content that is designed to influence viewer behavior, for example, to promote car maintenance services. In some cases, a carryover confounding duration is determined based upon how long viewers typically spend at the location. For example, a carryover confounding duration is determined based upon how long 95% viewers likely spend at the location. The data collection and transaction monitoring starts when the prior content ends for at least the carryover confounding duration. This is to reduce within-location carryover effects. Alternatively, the weighting of data may be based on the carryover confounding duration to account for the likelihood that a behavior was influenced by other pieces of related content.

In some implementations, the data collection period ends when the predetermined level of transactions is detected. In some other implementations, the data collection period ends after the predetermined level of transactions is detected. In some cases, the content controller of the system may switch the content when the data collection period ends. Data indicative of activities at the location where the piece of content is displayed may be collected and stored in a data repository. The collected data may further be weighted according to when the data is collected. The effectiveness of the piece of content on influencing view behavior is analyzed and determined based upon the collected data or the weighted data.

In another exemplary embodiment, the transaction-based content management system is used at a business where viewer behaviors happen at a high frequency. For example, the business is a quick-serve restaurant and the viewer behavior is a purchase of a certain meal. In this embodiment, the definition of a predetermined level of transactions received by the system can be a relatively large number of viewer behavior occurrences, so that the predetermined level of transactions happens at a sufficiently low frequency that it is unlikely to overwhelm the system with a series of rapid changes in experimental content, despite the high frequency occurrence of individual viewer behavior. For example, a predetermined level of transactions is defined as sales of 50 chicken sandwich baskets. In a particular embodiment, the predetermined level of transactions is defined such that it has a frequency of one occurrence per approximately two viewer visit durations. In some cases, a carryover confounding duration is determined based upon the viewer visit durations. The data collection and transaction monitoring starts when the prior content ends for a duration no shorter than the carryover confounding duration. Thus, within-location carryover effect is reduced.

In some implementations, the data collection period ends when the predetermined level of transactions is detected. In some other implementations, the data collection period ends after the predetermined level of transactions is detected. The content controller of the system may switch the content when the data collection period ends. Data indicative of activities may be collected and stored in a data repository. The collected data may further be weighted according to when the data is collected. The effectiveness of the piece of content on influencing view behavior is analyzed and determined based upon the collected data or the weighted data.

In yet another exemplary embodiment, the transaction-based content management system is used at a business where the desired occurrences happen at a moderate frequency. For example, the business is a grocery store and the viewer behavior is a purchase of certain item. In this embodiment, the definition of a predetermined level of transactions received by the system can be a moderate number of occurrences, so that the predetermined level of transactions happens at a sufficiently low frequency that it is unlikely to overwhelm the system with a series of rapid changes in experimental content, despite the frequency of individual occurrences. For example, a predetermined level of transactions is defined as sales of 10 boxes of cereal. In a particular embodiment, the predetermined level of transactions is defined such that it has a frequency of one occurrence per approximately two viewer visit durations. In some cases, a carryover confounding duration is determined based upon how long viewers typically spend at the location.

The data collection and transaction monitoring starts when the prior content ends for at least the carryover confounding duration. Thus, within-location carryover effect is reduced. In some cases, transaction occurrence is based upon weighted data. In some implementations, the data collection period ends when the predetermined level of transactions is detected. In some other implementations, the data collection period ends after the predetermined level of transactions is detected. The content controller of the system may switch the content when the data collection period ends. Data indicative of activities may be collected and stored in a data repository. The collected data may further be weighted according to when the data is collected. The effectiveness of the piece of content on influencing viewer behavior is analyzed and determined based upon the collected data or the weighted data.

What is claimed is:

1. A method of determining how effective content of interest is in influencing viewer behavior using a computer system having one or more processors and memories, comprising:

displaying, by digital signage, the content of interest according to a playlist at a location by a content controller implemented on one of the one or more processors;

receiving as an input a carryover confounding duration related to how long viewers spend at the location;

recording a data collection start time, by the content controller, wherein the data collection start time begins after the content of interest has been displayed for at least the carryover confounding duration;

after the data collection start time, measuring transaction data; wherein in some of the transaction data is indicative of one or more specified transactions at the location on one of the one or more processors; wherein a specified transaction is a transaction related to a viewer behavior that the content of interest is designed to influence;

when the one or more specified transactions are at or above a predetermined level, generating, by the transaction monitor, a transaction occurrence signal;

sending the transaction occurrence signal to the content controller;

recording a data collection end time and ceasing to measure transaction data when the transaction occurrence signal is received;

changing content displayed on the display according to the playlist in response to the transaction occurrence signal, by the content controller; and determining an indication of an effectiveness of the content of interest to influence viewer behavior using the measured data related to specified transactions collected between the data collection start time and data collection end time, wherein the indication of the relative effectiveness of the content of interest is determined based on a duration between the data collection start time and data collection end time.

2. A method according to claim 1, further comprising:

weighting the collected data based on when the collected data is collected during the duration between the data collection start time and the data collection end time; and determining the indication of the effectiveness of the content of interest to influence viewer behavior based on the weighted data.

3. A method according to claim 2, wherein weighting the collected data is further based on when the collected data is collected in reference to the carryover confounding duration.

4. A method according to claim 1, wherein the transactions comprise financial transactions.

5. A transaction-based content management system for a digital signage network having a plurality of displays at one or more locations, comprising:

a content controller configured to instruct digital signage at a location to display a first piece of content according to a playlist, wherein the content controller is further configured to receive as an input a carryover confounding duration related to how long viewers spend at the location, wherein the content controller is further configured to record a data collection start time, wherein the data collection start time begins after the first piece of content has been displayed for at least the carryover confounding duration;

a transaction monitor communicatively coupled to the content controller and configured to monitor transactions at the location after the data collection start time, wherein transactions comprise specified transactions;

wherein a specified transaction is a transaction related to a viewer behavior that the content of interest is designed to influence;

wherein the transaction monitor is configured to send a signal to the content controller when a predetermined level of specified transactions is reached, wherein the content controller is further configured to record a data collection end time and instruct the display to display a second piece of content according to the playlist in response to the signal;

a data acquisition unit coupled to the content controller and configured to collect data from the location including data relating to the specified transactions from the data collection start time to the data collection end time; and a data analysis unit coupled to the data acquisition unit and configured to determine an indication of an effectiveness of the first piece of content on influencing the viewer behavior based upon data relating to the specified transactions collected between the data collection start time and data collection end time, wherein the indication of the relative effectiveness of the first piece of content is determined based on a duration of time between the data collection start time and data collection end time.

6. The system of claim 5, wherein the data analysis unit is further configured to weigh the data indicative of activities based on when it is collected during the duration over which the piece of content is displayed and determine the indication of the effectiveness of the first piece of content on influencing the viewer behavior based on the weighted data.

7. A method of determining how effective content of interest is in influencing behavior of viewers of content on a digital signage network having a plurality of displays dispersed at one or more locations using a computer system having one or more processors and memories, comprising:

receiving as an input a carryover confounding duration related to how long viewers spend at the location;

recording a data collection start time, by a content controller implemented on the one or more processors, wherein the data collection start time begins after the content of interest has been displayed for at least the carryover confounding duration;

receiving data collected from a location indicative of activities occurring at the location while the content of interest was displayed on a display at the location, the data collected being collected for a period of time from the data collection start time until a predetermined level of one or more specified activities indicative of a viewer behavior that the content of interest is designed to influence is reached at the location;

recording a data collection end time, by the content controller, when a predetermined level of one or more specified activities is reached at the location; and determining, by a data analysis unit implemented on one of the one or more processors, how effective the content of interest is in influencing behaviors of viewers using the received data related to the specified activities collected between the data collection start time and data collection end time, and based on a duration between the data collection start time and data collection end time.

8. A method according to claim 7, further comprising:

weighting the collected data based on when the collected data is collected during the duration over which the content of interest is displayed; and determining the indication of the effectiveness of the content of interest to influence viewer behavior based on the weighted data.

9. A method according to claim 8, wherein weighting the collected data is further based on when the collected data is collected in reference to the carryover confounding duration.

* * * * *